United States Patent [19]

Fredericks et al.

[11] Patent Number: 4,939,735
[45] Date of Patent: Jul. 3, 1990

[54] INFORMATION HANDLING SYSTEM HAVING SERIAL CHANNEL TO CONTROL UNIT LINK

[75] Inventors: Kenneth J. Fredericks, Poughkeepsie; Joseph J. Kubik, Wappingers Falls; Michael R. Wiegand; Lee H. Wilson, both of Poughkeepsie, all of N.Y.

[73] Assignee: International Business Machines Corporation, Armonk, N.Y.

[21] Appl. No.: 222,679

[22] Filed: Jul. 21, 1988

[51] Int. Cl.⁵ .............................................. G06F 11/00
[52] U.S. Cl. .................................... 371/47.1; 364/200; 371/55; 371/69.1
[58] Field of Search ................. 371/55, 57, 69, 47.1, 371/69.1; 364/200, 900

[56] References Cited

U.S. PATENT DOCUMENTS 3,344,353  9/1967  Wilcox .................................. 371/69
4,811,361  3/1989  Bacou et al. ........................... 371/55
4,841,475  6/1989  Ishizuka .............................. 364/900

Primary Examiner—Charles E. Atkinson
Attorney, Agent, or Firm—Robert L. Troike; George E. Clark

[57] ABSTRACT

An information handling system includes a processor with one or more channels for communicating to peripheral devices controlled by peripheral device controllers, and one or more serial data links between the channels and the peripheral controllers. Data is transmitted over the serial data link between the channels and the controllers in a frame format, wherein each frame includes a number of eight-bit characters selected so that all standard parallel interface tag and data lines are transmitted in a single frame with a high degree of error immunity resulting from selection of idle characters and frame start characters having the mutual characteristic that single and double bit errors in the idle characters do not create an erroneous indication of a start character in the system.

11 Claims, 5 Drawing Sheets

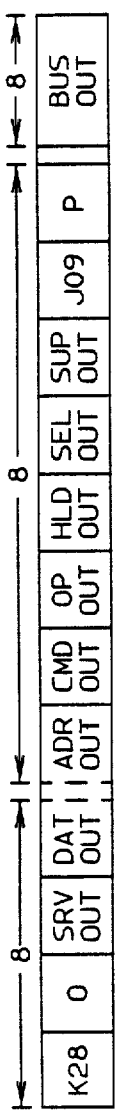
FIG. 5A OUT-BOUND FRAME
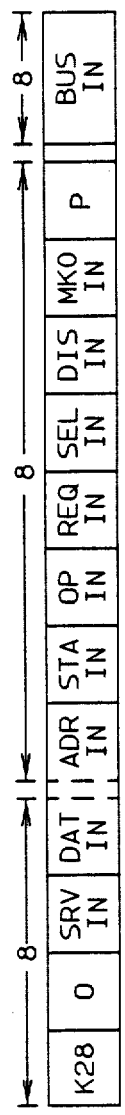
FIG. 5B IN-BOUND FRAME
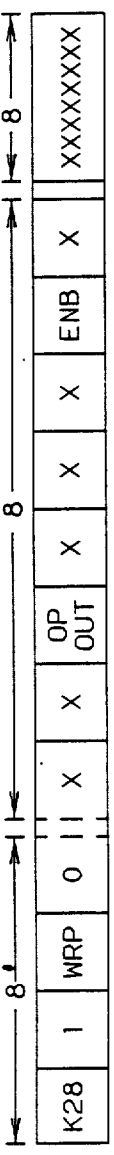
FIG. 5C CONTROL FRAME

INFORMATION HANDLING SYSTEM HAVING SERIAL CHANNEL TO CONTROL UNIT LINK

FIELD OF THE INVENTION

1. Background of the Invention

The present invention relates to information handling systems and more particularly to information handling systems in which data is communicated between a processor and remote peripheral devices through a channel to peripheral controller serial data exchange link.

There are many information handling systems in the prior art which transmit data between a processor channel and a peripheral device across a serial data transmission link. Among those information handling systems, are the following patented and published systems which have come to the attention of the inventors.

U.S. Pat. No. 4,486,739, entitled Byte Oriented DC Balanced 8B/10B Partitioned Block Transmission Code discusses an encoder and a DC balanced code for the effective transmission of data for efficient error recovery. The code and the encoding and decoding method taught by the patent may be effectively used to implement a portion of the preferred embodiment of the present invention as described herein.

U.S. Pat. No. 4,642,629 describes a logic system for connection between parallel channel devices, such as a computer and a peripheral device.

Although the patent generally discusses data transmission across a serial data link, the patent does not teach nor suggest multi-character frame encoded serial data transmission in an information handling system as is taught and claimed herein.

U.S. Pat. No. 4,366,478 discloses a signal transmitting and receiving apparatus for transmitting and receiving parallel by word data signals, converting the parallel data signals to serial and transmitting the serial data signals to control units connected in a multi-drop configuration. An external control mode and an internal control mode in receiving the parallel data signal, a simulation mode and the prevention of competing status between a write timing of the parallel data to a memory buffer and a read timing of the data for converting it to serial data are also described.

The patent does not teach a multi-character frame encoded serial data transmission in an information handling system as is described and claimed herein.

U.S. Pat. No. 4,683,567 describes an asynchronous signalling system for digital communication on a serial channel including the transmission of a selected unique N bit code corresponding to an associated signalling message being continually transmitted until a change is desired. Decoder logic at the receiving end examines a new group of signalling bits during each signalling bit interval without reference to the start of a transmitted code word and makes a decision during each signalling bit interval as to what signalling message was transmitted.

Although the patent teaches serial transmission of coded data across a serial channel, the patent does not teach nor suggest transmission of a multi-character frame of encoded data on a serial data link as is taught and claimed herein.

U.S. Pat. No. 4,688,226, teaches method and apparatus for overlaying code errors into digital signals to be transmitted to enhance recovery of the digital signal at the receiver.

Although the patent generally discloses encoded transmission of data across a serial data link, it does not teach nor suggest multi-character frame transmission of coded data as is taught and claimed herein.

U.S. Pat. No. 4,698,809 teaches another method and apparatus for channelized serial transmission of redundantly encoded binary data focusing primarily on a coding scheme for accomplishing that result.

The patent does not teach nor suggest the efficient and error immune transmission of multi-character frames of encoded data in an information handling system as are taught and claimed herein.

U.S. Pat. No. 4,712,176 describes, in an information handling system having a channel to peripheral control unit data path, a serial channel interface with method and apparatus for handling data streaming and data interlock modes of data transfer for extending the distance that a device controller may be placed from the channel in such a system.

The patent is assigned to the assignee herein and represents a prior serial channel to control unit interface apparatus and method. However, the patent does not teach nor suggest the error immune multi-character frame serial data transmission of encoded data as is taught and claimed herein.

IBM Technical Disclosure Bulletin Volume 19, Number 8, January, 1977, page 3139 entitled "Serial Channel to I/O Interface" is a prior art system for transmitting data on a serial data link between a channel and a device control unit in an information handling system employing substantially the same interface protocol as is described with respect to the preferred embodiment of the present invention and which generates and transmit data across the serial link in packets called frames, wherein each frame has a flag followed by serialized data.

However, the publication does not teach nor suggest the transmission of multi-character frames encoded data across a serial data link as is described and claimed herein.

IBM Technical Disclosure Bulletin, Volume 28, Number 11, April, 1986, page 4735, describes a prior art format for serial data frame transmission with WRAP and force disable messages and special handling for MARK 0 IN with STATUS IN. The publication describes frame formats for special situations which occur in channel to control unit communication systems outside of normal data transfer.

Although the publication generally describes serial data transfer frame structure, it does not teach nor suggest an error reduced multi-character frame transmission of serial data as is described and claimed herein.

Although there are many prior art systems for communicating data across a serial data link between a channel and a device control unit in an information handling system, none of the prior art known to the inventor teaches nor suggest the unique and novel features and advantages of the present invention as described and claimed herein.

SUMMARY OF THE INVENTION

Accordingly, apparatus and method for communicating digital data across a serial data link to extend the distance that peripheral device controllers may be operated from a channel in an information handling system is described. The information handling system includes a processor, one or more channels for communicating between the processor and one or more peripheral device controllers, one or more peripheral device controllers for controlling one more more peripheral devices in response to signals from said channel in accordance with a predetermined communications protocol, and a serial data link adapter connected between one of said channels and one or more said peripheral device controllers for extending the range of communications between said channels and said controllers, said adapter further including, first and second sub-adapters each communicating with the other across a serial data link, and each sub-adapter including frame generation means responsive to signals received from said channel and said peripheral device controller respectively, said signals conforming to said predetermined protocol, said frame generation means including means for generating one or more unique frame start characters in response to control signals received by said frame generation means, and means for generating predetermined idle characters, said idle characters having an error immune relationship to said start character such that single and double errors occurring in bits of IDLE characters transmitted on said serial data link will not generate an erroneous start character, an encoder for encoding data for efficient and error free transmission over said serial data link, a serializer for converting said encoded data from parallel format to serial format, link interface and driver means for transmitting serialized encoded data across said serial data link, and in a receive section of said sub-adapter a receiver for receiving said encoded serialized data, a deserializer for converting said serial encoded data to parallel format, a decoder for recovering digital data in an error free form and interface adapter means for reconstructing data and control signals in said predetermined protocol for transmission to said one or more peripheral device controllers.

It is an advantage of the present invention to transmit data across a serial data link in an information handling system wherein all control and data signals are incorporated in a single multi-character frame.

It is a further advantage of the present invention that start character and idle characters are selected and generated to eliminate the detection of erroneous start characters due to single and double bit errors in the transmission of IDLE characters across the serial data link.

The foregoing and other objects, features, and other advantages of the invention will be apparent from the following more particular description of the preferred embodiment of the invention as illustrated in the accompanying drawing.

BRIEF DESCRIPTION OF THE DRAWING

FIG. 5A is a diagram of a multi-character frame structure for OUT bound frames for data transmission from channel to controller.

FIG. 5B is a diagram of a multi-character IN bound frame structure for data and control transmission from the device controller to a channel in accordance with a preferred embodiment of the present invention.

FIG. 5C is a diagram of a multi-character control frame structure for transmitting preselected control signals between the first and second sub-adapters on either end of the serial data link in accordance with a preferred embodiment of the present invention.

DETAILED DESCRIPTION OF A PREFERRED EMBODIMENT OF THE INVENTION

Figure 1:
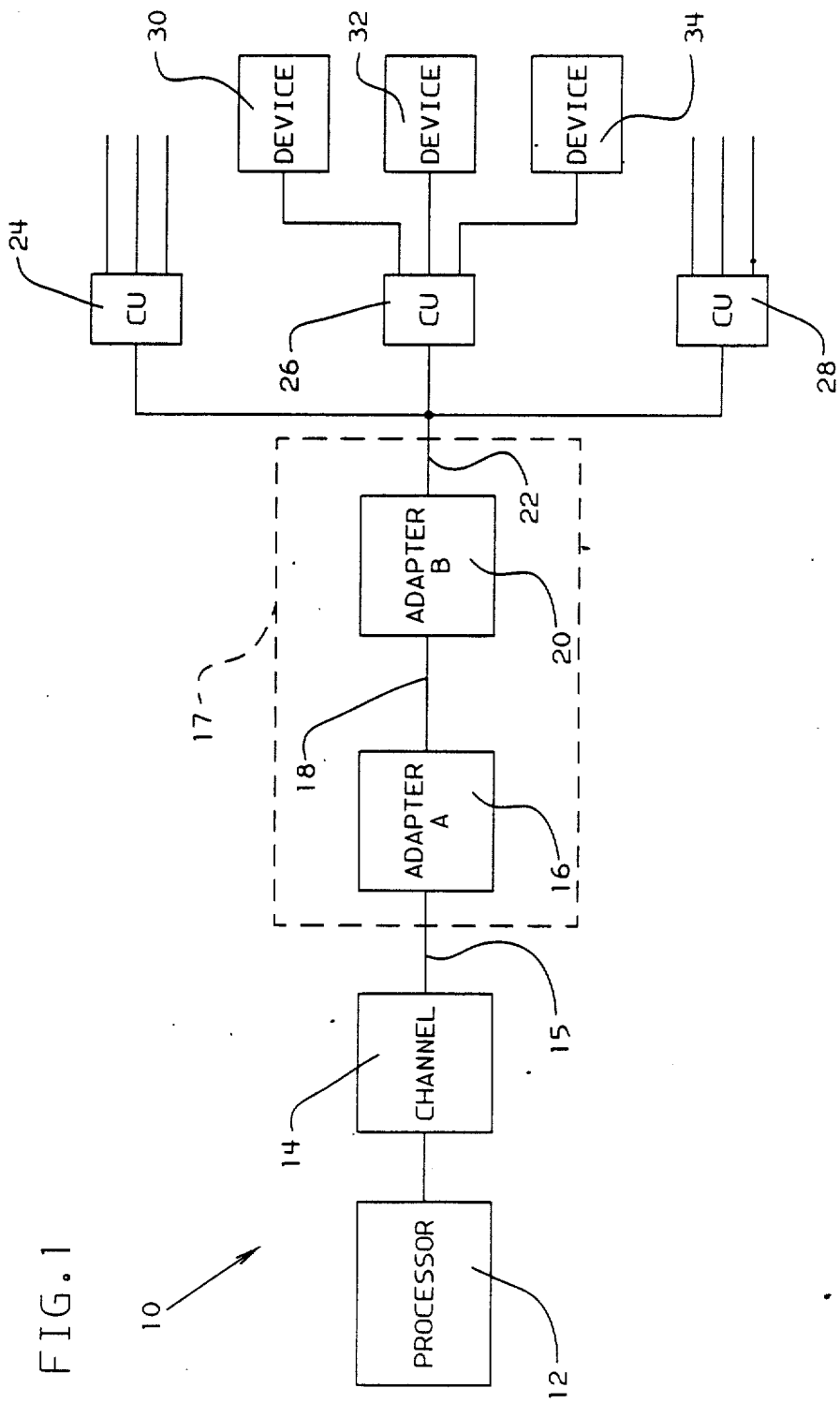
FIG. 1 is a block diagram of an information handling system including a serial channel to peripheral device controller link in accordance with a preferred embodiment of the present invention.

Referring now to FIG. 1, an information handling system 10 will be described embodying the present invention.

A processor 12, such as a main frame IBM Model 3090-200E processing system, is connected to one or more channels 14 for communication with peripheral devices 30, 32, 34 etc. The channel communicates with device controllers 24, 26, 28, etc. across a standard channel to control unit interface which is fully described in a publication available from International Business Machines Corporation, entitled "IBM System/360 and System/370 I/O Interface Channel to Control Unit Original Equipment Manufacturers Information", publication number GA22-6974-08. This interface has been discussed in many prior art references including the Lynch and Thorn IBM Technical Disclosure Bulletin article in the January, 1977 issue of the TDB and U.S. Pat. No. 4,712,176, both discussed above in the Background of the Invention. The standard System 370 channel interface thus described is a parallel interface which includes a number of control lines sometimes referred to as Tags such as SERVICE OUT, DATA OUT, ADDRESS OUT, COMMAND OUT, OP OUT, HOLD OUT, SELECT OUT, SUPPRESS OUT, SERVICE IN, DATA IN, ADDRESS IN, STATUS IN, OP IN, REQUEST IN, DISCONNECT IN and SELECT IN. There is also an eight bit data bus which is referred to as Bus Out for transmission of data from channel to controller and Bus In for transmission of data from controller to channel. Both the referenced TDB article and the U.S. Pat. No. 4,712,176 further discuss the limitation imposed by wired communication on the distance that a device controller can be placed from the channel.

Reference is hereby made to the 176 Patent and the TDB article for further discussion of distance limitation and the channel to controller INPUT/OUTPUT parallel interface operation.

Channel 14 communicates with controllers 24, 26, 28, etc. across the standard channel to controller INPUT/OUTPUT parallel interface discussed above, on lines 15, 22, wherein lines 15 represent the channel to controller interface at the channel 14 end and lines 22 represent the channel to controller interface at the controller end. A serial data link adapter 17 connects the interface on lines 15 at one location to the interface on lines 22 at another location to extend the maximum distance that controllers and devices can be placed away from processors and channels. Serial data link adapter 17 includes two sub-adapters 16 at the channel end and 20 at the controller end. The sub-adapters are connected by a serial link, such as an optical fiber duplex path 18. Sub-adapter 16 is also referred herein to as sub-adapter A and sub-adapter 20 is also referred to herein as sub-adapter B.

Figure 2:
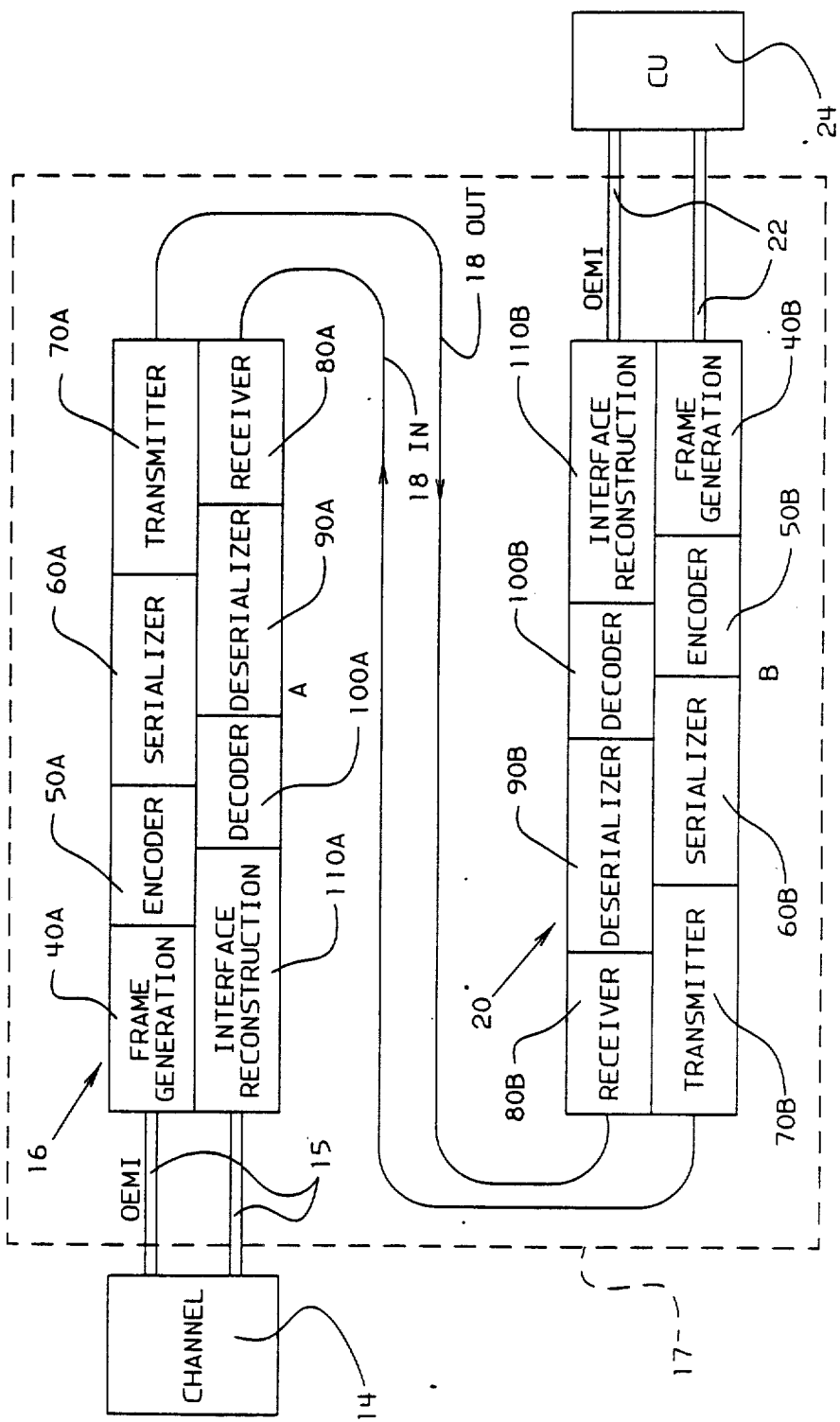
FIG. 2 is a block diagram showing a serial data link adapter including the first and second sub-adapters for communicating between a channel and a peripheral device controller in accordance with the information handling system shown in FIG. 1.

Referring now to FIG. 2, serial data link adapter 17 including sub-adapters 16 and 20 will be described in greater detail.

It should be noted that the structure of sub-adapter 16 and 20 are substantially the same, as can be seen from the block diagram of FIG. 2. However, the data flow in sub-adapter 16 is from the channel to the serial data link 18 through the link 18 on lines 180 indicating OUT bound data transmission and through the receive portion of sub-adapter 20 to interface 22 at the controller end. The data flow on the IN bound lines is from the parallel interface 22 at the controller end through the transmit portion of sub-adapter 20 along data link IN bound path 18I and through the receive portion of sub-adapter 16 to the channel interface on lines 15. Since the functions in each sub-adapter are essentially the same, each sub-adapter having a transmit portion and a receive portion, for duplex operation, the sub-adapters will be described wherein common functions in the sub-adapters will be identified with common numeric reference characters having an alphabetic character A to represent the function in sub-adapter 16 and an alphabetic character B to represent the function in sub-adapter 20.

It will be clear from the following description of the data path what the functions are of each sub-adapter and how they relate t each other.

Data in parallel form is presented on the parallel interface 15, 22 to frame generation logic 40A, 40B, where it is converted into a multi-character frame format for transmission. The frame generation logic will be described in greater detail with reference to FIG. 3 below. The multi-character frame is then encoded by encoder 50A, 50B which may be efficiently implemented by the encoder and DC balanced 8/10 transmission code taught in U.S. Pat. No. 4,486,739 of Franaszek and Widmer referenced above and incorporated by reference herein. The encoded frame is then serialized by serializers 60A, 60B which may be implemented in any one of a number of parallel to serial converters well-known in the art. The serial multi-character frame is then converted from electrical signals to optical signals for transmission across an optical data link 18 in this preferred embodiment of the invention, by transmitters 70A, 70B and then transmitted on optical data link 18 to the receiver 80A, 80B in the other sub-adapter 20, 16. Receivers 80A, 80B convert the optical signals to electrical signals for presentation to deserializer 90A, 90B which as with the serializers may be in a form of serial to parallel converter well-known in the art and which will not be further described herein. The received data in parallel form is then decoded by decoders 100A, 100B which decoders would be the compliment of the encoder described in the 739 patent. The decoded frame is then operated on by interface reconstruction logic 110A, 110B where it is converted back to the protocol of the channel to controller interface. The logic for the interface reconstruction will be described in greater detail with respect to FIG. 4 below.

The IN bound data path of serial data link adapter is substantially the mirror image of the OUT bound path just described. Signals and data appear on standard interface 22 from control units 24, etc. and are transmitted to frame generation logic 40B which is essentially the same as frame generation logic 40A discussed above with respect to sub-adapter 16. The multi-character frame information is then passed to encoder 50B for encoding in an appropriate run length code such as the eight/ten code described in U.S. Pat. No. 4,486,739 to Franaszek and Widmer referenced above. The encoded frame is then serialized by serializers 60B and converted to optical signals and transmitted to sub-adapter 16 by a transmitter 70B over IN bound serial data link 18I. The IN bound portion of sub-adapter 16 includes a receiver 80A which performs the same function as receiver 80B in sub-adapter 20, a deserializer 90A, a decoder 110A and interface reconstruction logic 110A which perform the same functions as the corresponding functions 90B, 100B, 110B in sub-adapter 20.

To eliminate unnecessary description of known elements, the optical elements including transmitter 70A, 70B, and receivers 80A, 80B will not be further described since these elements are commercially available from a number of sources such as an American Telephone and Telegraph model ODL 200 transmit/receive pair and although necessary elements to the serial data link structure of the preferred embodiment of the invention, are not essential to the present invention as claimed since any serial data link with appropriate transmitters and receivers could be employed within the scope of the invention.

Similarly, encoders 50A, 50B and decoders 100A, 100B will not be further described herein but rather for the purpose of the preferred embodiment of the present invention, the Franaszek and Widmer encoding scheme using the 8/10 DC balanced code as shown in U.S. Pat. No. 4,486,739 incorporated herein will be employed. It should be noted that although the incorporated patent discloses a coding scheme and an encoder, it is easily within the skill of those skilled in the art to implement a decoder by reversing the functions of the encoder shown in FIGS. 1 and following of the incorporated patent.

It should also be noted that the patent recognizes and identifies special characteristics for twelve characters identified with the first element K, and from these special K characters the error immunity characteristics of the present invention are derived. Serializers and deserializers 60A and 60B and 90A, 90B, may be implemented by any of a wide variety of serial to parallel and parallel to serial converters all of which are well-known in the art and do not require invention for implementation.

Figure 3:
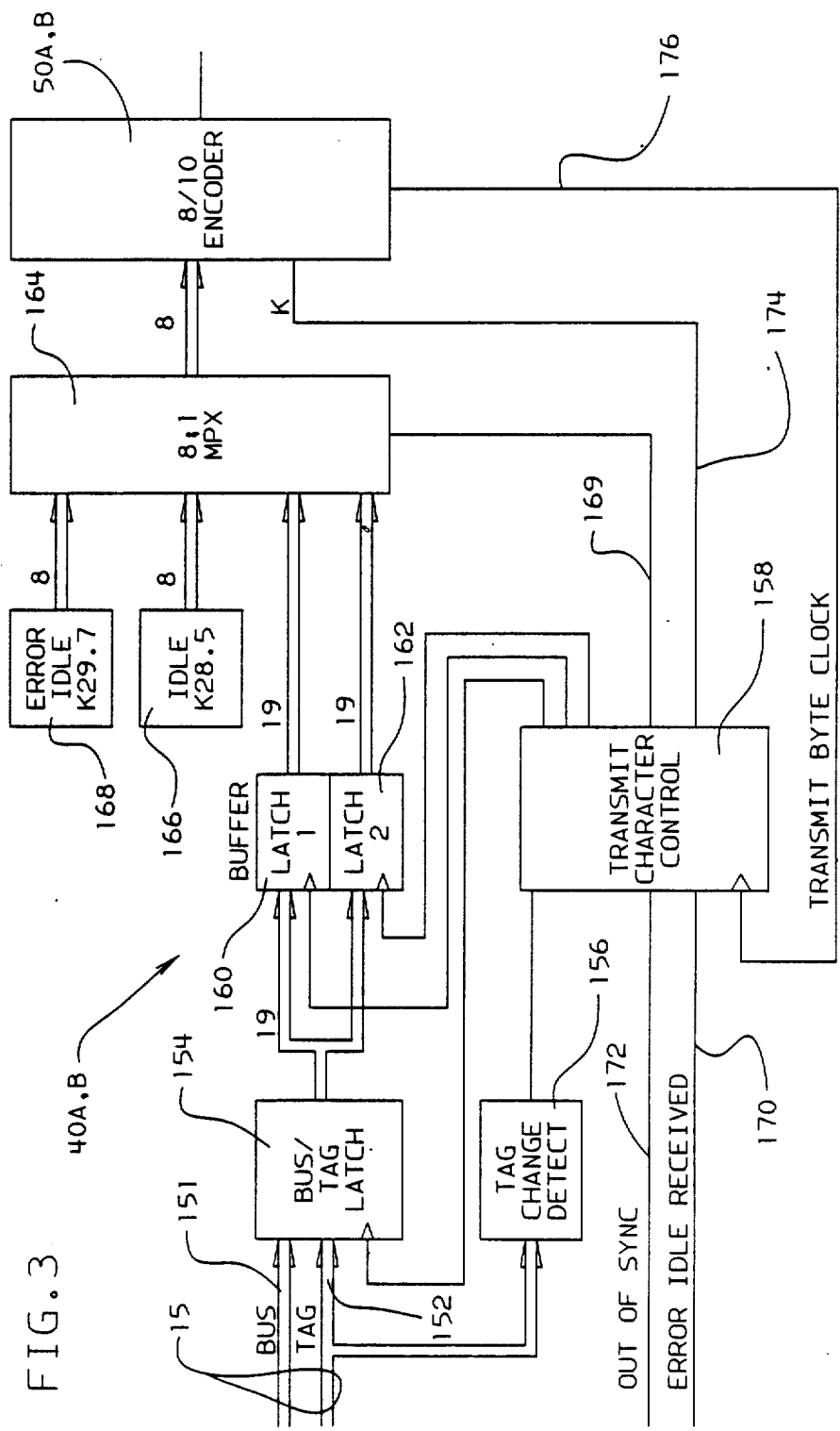
FIG. 3 is a block diagram of frame generation logic in accordance with the serial data link adapter shown in FIG. 2.
Figure 4:
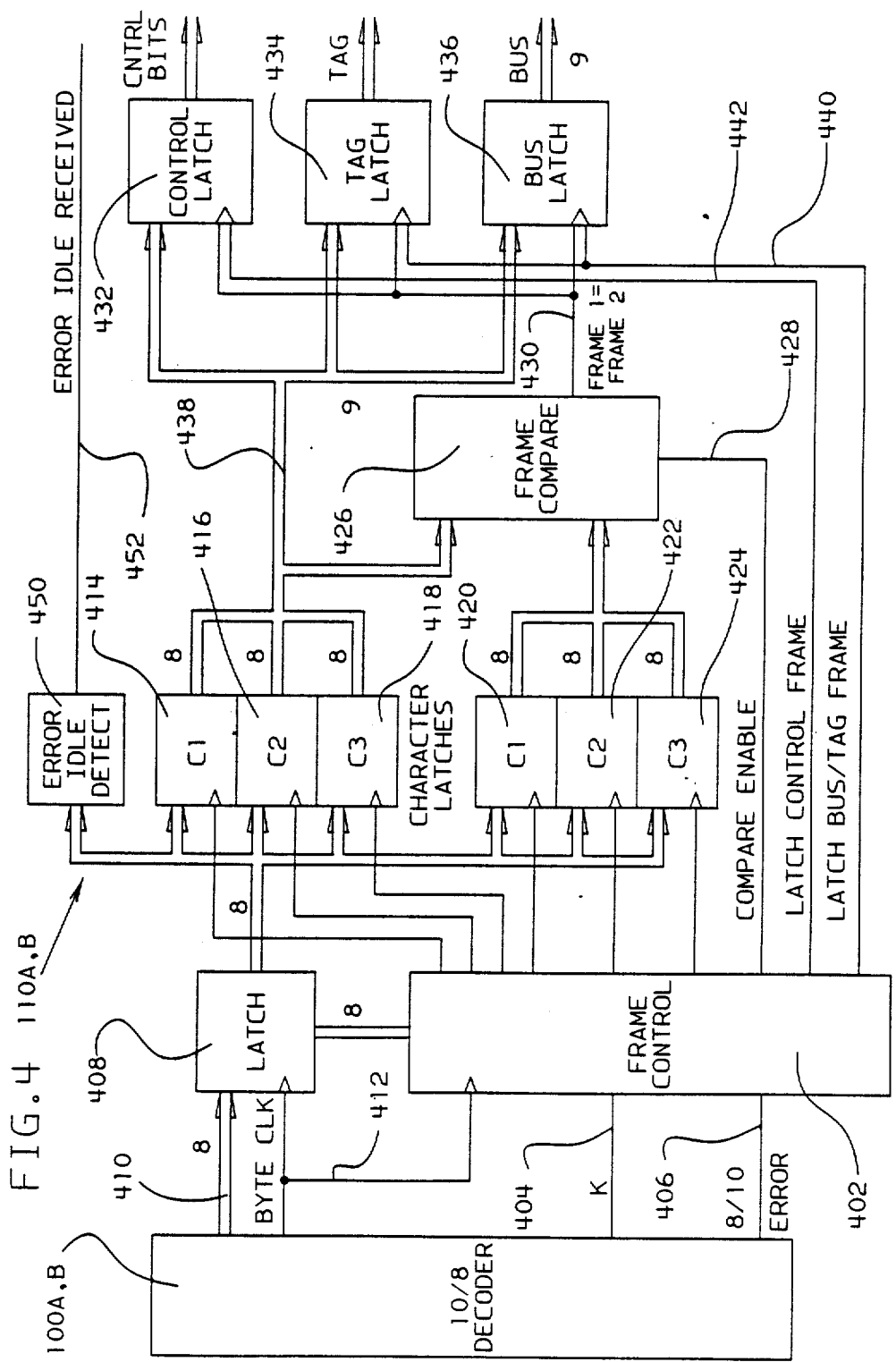
FIG. 4 is a block diagram of interface reconstruction logic in accordance with the serial data link adapter shown in FIG. 2.

The frame generation logic 40A, 40B will be described now in greater detail with reference to FIG. 3.

The standard INPUT/OUTPUT interface on lines 15/22 includes a group of control or tag signals on lines 152 and a data bus on lines 151. These tag and bus lines are latched in multi-bit latches 154. Also, the tag lines are connected to a tag change detector 156 which examines tag signals for rising or falling edges indicating a change in tag condition. Tag change detector 156 controls transmit character control 158 which in turn controls gating of bus and tag latches 154 and buffer latches 160 and 162 as well as, multiplexer 164 and encoder 50A, 50B. Both of the latches 160 and 162 permit the loading of one frame into a latch such as latch 160 while a previous frame which had been stored in buffer latches 162 is being transmitted.

Buffer latches 160 and 162 can also be used for redundant frame transmission by storing a frame into one set of buffer latches 160 or 162 and transmitting the same frame twice to ensure error-free data transmission.

Referring now also to FIG. 5A, the multi-character frame structure for serial data transmission in accordance with the present invention will be described in relation to the frame generation logic 40A, B. The OUT bound frame shown in FIG. 5A includes a first character which has five bits dedicated to one of the twelve special K characters set forth in the Franaszek and Widmer patent in Table 3. The next three bits of the first eight bit character provide the second half of the K character definition to determine whether the character an idle character, an error idle character or one of several possible start characters. As seen in FIG. 3, the idle character defined as K28.5 is prestored in latches 166 and the error idle character defined as K29.7 is stored in latches 168. Each of these characters present eight bits on one set of inputs to multiplexer 164 for selection for transmission under the control of transmit character control 158. For example, when an Out of Sync signal is received on line 172, the transmit character control block 158 causes the multiplexer 164 to select a combination of error idle characters from latches 168 with idle characters from latches 166 in sequence, for example a three character error idle sequence there might be one error idle character sent followed by two idle characters. Thus, transmit character control 158 would first gate the error idle character K29.7 from latches 168 through multiplexer 164 to encoder 50A, 50B followed by the idle character K28.5 from latches 166 through multiplexer 164 to encoder 50A, 50B twice in succession for form the three character frame idle error sequence.

The operation of transmit character control 158 may be implemented by a simple State Machine with sequence control being triggered by transmit byte clock on line 176 from encoder 50A, 50B.

It should be noted that there are nineteen bits stored in buffers 160 and 162 respectfully. As previously discussed, the frame structure used in the accordance with the preferred embodiment of the present invention contains three eight bit characters transmitted in sequence for a total of twenty-four bits per frame before encoding.

It should be noted at this point that because the SERVICE OUT tag and the DATA OUT tag occupy the last two bits of the first character of OUT bound frame and correspondingly the service IN and data IN tags occupy the last two bits of the first character of the IN bound frame as shown in FIG. 5B. Since there is a potential conflict between the start character and the service and DATA IN/OUT tags in the first character of the OUT bound frame and IN bound frame respectively, one of four different characters, K28.0, K28.2, K28.4, K28.6 must be selected as the start character depending on whether the SERVICE or DATA OUT/IN tags are active on the interface. For example, if the SERVICE OUT or DATE OUT tags are inactive, it is mos likely that start character K28.0 will be used.

As can also be seen in FIGS. 5A, and 5B, the second character of the OUT bound frame and the IN bound frame carry OUT tag lines and IN tags respectively with the third character of the frames containing the eight bit BUS OUT on the OUT bound frame and BUS IN on the IN bound frame respectively.

After the frame thus generated has been encoded, serialized, transmitted over the serial data link, received, deserialized and decoded, the standard interface must be reconstructed to communicate with controllers 24, 26 and 28, etc. Interface reconstruction logic 110A and 110B perform this reconstruction function and may be readily implemented by the logic to be described as follows with reference to FIG. 4.

As parallel characters are recovered and decoded by decoder 100A, 100B the K character as described above with reference to FIGS. 5A and 5B is transmitted to frame control 402 on lines 404. If an error occurs in the encoder/decoder 50A, 50B, 100A, 100B, a coding error signal is presented on line 406 to frame control 402. Also, as a character is decoded, the eight bits of the character are presented to data latches 408 on eight bit bus 410 and a byte clock is presented on line 412 to latches 408 and frame control 402. As each eight bit character is recovered, after it is stored in latches 408, under the control of frame control 402, the characters are gated to the appropriate set of character latches 414 for the first character of a frame, C1, 416 for the second character of a frame, C2, 418 for the third character of a frame, C3. For the purpose of performing frame compare, a second frame would be stored, character by character, in character latches 420 for character C1, 422 for second character, C2, and 424 for third character, C3, respectively.

There are two modes of transmission which are commonly used in processor to controller communication. One mode uses the transmission of a single frame on the serial data link, each followed by at least one idle characters (K28.5) between frames. The second mode uses the transmission of double frames, each data frame is transmitted twice in succession with no idle characters transmitted between the two identical frames.

If double transmission mode is to be used, the transmit character control block 158 in the frame generation logic as 40A, 40B receives a signal identifying double frame transmission mode, which signal is used to set a 2 frame mode latch for controlling the gating of the nineteen bits stored in either buffer latches 1160 or buffer latches 2162 to the multiplexer 164. In the double frame transmission mode, the nineteen bits from the selected latch 160 or 162 respectively will be gated twice on successive cycles to multiplexer 164 for encoding, serialization and transmission. A next frame stored in the other latch 162 or 160 respectively may then be sent twice in succession and so on.

If a double frame transmission protocol is being used for increased error immunity, frame compare 426 compares the twenty four recovered bits of the first frame stored in latches 414, 416, and 418 respectively, with the twenty four bits for the second frame stored in character latches 420, 422 and 424 respectively. Frame compare 426 operates under the control of frame control 402 when the compare enable line 428 is active. Compare enable is only active when the double frame transmission mode is being used. If there is a TRUE frame compare, compare output 430 provides enable signals to output latches 432 for control bits, 434, for tag lines and 436 for the data bus. The twenty-four bits of the frame are output from latches 414, 416 and 418 on bus 438 which provides a first set of inputs to frame compare 426 and are connected to appropriate ones of control latches 432, tag latches 434 and data bus latches 436 respectively.

It should be noted, that the normal data transmission mode of operation results in data bus and tag frames being transmitted with frame control 402 producing an enable signal on line 440 to tag latches 434 and bus latches 436.

Occasionally, it is desirable to perform tests on the serial data link adapter such as for error determination or maintenance. In such cases it is desirable to be able to perform a WRAP function to test the integrity of the complete serial data path.

A wrap feature is implemented using a control frame, such as the control frame shown in FIG. 5C. Serial data link sub-adapters 16 and 20 may have a wrap test button on a control button on a control panel. When the wrap test button is pressed, in either sub-adapter 16 or 20, a control frame is generated. The wrap bit (indicated as WRP in the first character of the control frame) is set to a predetermined state, and the serial data link between sub-adapter 16 and 20 is tested.

The control frame is also used to test the integrity of the serial data link before it is enabled. To put a link into service, the serial data path must be attached, sub-adapter 16 and 20 must be powered up and sub-adapter 20 enabled. If these conditions are met, sub-adapter 16 can be enabled. Switching the link enable switch to the link enabled position generates a control frame with enable bit as indicated in character 2 of control frame of FIG. 5C, set ON. Receipt of the return control frame from sub-adapter 20 verifies the integrity of the link and allows the link to be logically enabled. A control frame with the enable bit set ON forces sub-adapter 20 to perform a system reset to all remote control units and then sets the OP OUT tag to the state latched in the control frame.

A control frame is recognized by having a start character of K28.1 or K28.3.

If a control frame has been decoded, frame control 402 generates a control frame enable signal on lines 442 to control latches 432 indicating that the information contained on bus 438 is control information and not tag or data information. The control information is used by the controller 24, 26, 28, etc., for test and maintenance purposes and does not relate to the transmission of tag and data from channel to peripheral device.

As has been mentioned above with respect to FIG. 3, character K29.7 is established as the error idle character. An error idle sequence will consist of the error idle character K29.7 followed by two idle characters 28.5, thus the sequence will be K29.7, K28.5, K28.5. This sequence will be repeated on the line until corrected. An error idle detect circuit 450 is also connected to the eight bit parallel output of latches 408. If the eight bits presented at the output of latches 408 are the character K29.7 which represents the error idle condition, the error idle received signal is active on line 452 the output of error idle detect circuit 450.

Each of the elements of serial adapter 17 have been described with reference to a preferred embodiment of the referenced invention.

The information handling system having serial channel to control unit link as described with reference to a preferred embodiment thereof provides data communication with error immunity between elements of the information handling system without the need for cyclical redundancy checking (CRC) logic to be employed at either the transmitting or receiving end which eliminates the complexity of such CRC logic and reduces the number of bits which must be transmitted on the serial link.

It should be understood that there are many alternatives which could be employed for the various elements of the invention without departing from the spirit or scope of the invention.

What is claimed is:

1. An information handling system for processing data communicated between a processor and one or more peripheral devices on a serial data link, comprising:
   a processor for processing said data;
   one or more channels for communicating between said processor and one or more peripheral device controllers;
   one or more peripheral device controllers for controlling one or more peripheral devices in response to signals from said channel in accordance with a predetermined communications protocol;
   a serial data link, adapter connected between one of said channels and one or more of said peripheral device controllers for extending the range of communications between said channels and said controllers, said adapter further comprising:
   first and second sub-adapters, each communicating with the other across said serial data link and each sub-adapter having transmit and receive sections, said transmit section comprising:
   frame generation means responsive to signals received from said channel and said peripheral device controller respectively, said signals conforming to said predetermined protocol, said frame generation means including means for generating one or more unique start frame characters in response to control signals received by said frame generation means;
   means for generating predetermined idle characters, said idle characters having an error immune relationship with said start characters, such that idle characters having single and double bit errors transmitted on said serial data link will not be recognized as start frame characters;
   an encoder for encoding data for efficient and error free transmission over said data link;
   a serializer for converting said encoded data from parallel format to serial format;
   link interface and driver means for transmitting serialized encoded data across said serial data link; and said receive section of each of said sub-adapter, comprising:
   a receiver for receiving said encoded serialized data;
   a deserializer for converting said serial encoded data to parallel format;
   a decoder for recovering digital data in an error free form; and
   interface means for reconstructing data and control signals in said predetermined protocol for transmission to said one or more peripheral device controllers or to said channel.

2. An information handling system according to claim 1 wherein said frame generation means further comprises:
   means for controlling transmission of frames of information on said serial data link in one of a plurality of predetermined transmission modes.

3. An information handling system according to claim 2 wherein said control means comprises means for controlling the transmission of frames of information in a double transmission mode without intervening idle characters.

4. An information handling system according to claim 2 wherein said control means comprises means for controlling the transmission of frames of information in a single frame transmission mode with one or more intervening idle characters between frames.

5. An information handling system according to claim 1 wherein said frame generation means further comprises:
means for transmitting control and data signals between said channel and said peripheral device controller in a single frame having a plurality of characters therein.

6. An information handling system according to claim 5 wherein said frame comprises three characters,
a first character including one of a plurality of predetermined start characters,
said start character being selected for error immunity with respect to an idle character,
a second character of said frame including a plurality of control signals, and
a third character of said frame including a plurality of data signals.

7. An information handling system according to claim 1 wherein said interface means for reconstructing comprises:
frame control means for controlling recovery of frame information transmitted in any of said plurality of transmission modes.

8. An information handling system according to claim 7 wherein said frame control means further comprises means for detecting a control frame, wherein said control frame contains signals used to test the integrity of said serial data link adapter.

9. An information handling system according to claim 1, wherein said interface means for reconstructing further comprises:
frame compare means for comparing a first and second frame transmission transmitted in a double frame transmission mode for testing integrity of transmission.

10. An information handling system according to claim 1, wherein said interface means for reconstructing further comprises:
means for detecting a predetermined error character sequence, and means for transmitting said error character sequence until said error has been eliminated.

11. An information handling system according to claim 1, wherein said serial data link adapter further comprises means for detecting beginning and end of frame transmission.

* * * * *